(12) United States Patent
Mimura et al.

(10) Patent No.: US 7,821,599 B2
(45) Date of Patent: Oct. 26, 2010

(54) IMAGE DISPLAY

(75) Inventors: Koji Mimura, Kawasaki (JP); Ken Sumiyoshi, Kawasaki (JP); Jin Matsushima, Kawasaki (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 647 days.

(21) Appl. No.: 11/775,563

(22) Filed: Jul. 10, 2007

(65) Prior Publication Data
US 2008/0043187 A1 Feb. 21, 2008

(30) Foreign Application Priority Data
Aug. 15, 2006 (JP) .............. 2006-221498

(51) Int. Cl.
G02F 1/1335 (2006.01)
(52) U.S. Cl. ............... 349/114; 349/113; 349/115
(58) Field of Classification Search ............... None
See application file for complete search history.

(56) References Cited

U.S. PATENT DOCUMENTS 6,842,209 B2 * 1/2005 Sumiyoshi et al. .......... 349/115
6,995,819 B2 * 2/2006 Kaneko et al. .............. 349/112

FOREIGN PATENT DOCUMENTS

| CN | 1517951 A | 8/2004 |
| JP | 10-206844 A | 8/1998 |
| JP | 11-242226 A | 9/1999 |
| JP | 2002-23156 A | 1/2002 |
| JP | 2004-69835 A | 3/2004 |

* cited by examiner

Primary Examiner—Tina M Wong
(74) Attorney, Agent, or Firm—Sughrue Mion, PLLC

(57) ABSTRACT

A liquid crystal display element is disclosed for displaying an image. The liquid crystal display element comprises a liquid crystal display layer in which voltages are applied to a transmissive display unit and a reflective display unit, defined in one pixel, independently of each other, and a light source for irradiating the liquid crystal display layer with light from the back, and a reflection control element disposed between the liquid crystal display layer and light source. The liquid crystal display element is switched between a reflective state and a transmissive state in accordance with a voltage applied to the reflection control element. The liquid crystal display element is switched among a transmissive display mode, a combined reflective/transmissive display mode, and a reflective display mode, by utilizing the transmissive display unit and reflective display unit to display an image independently of each other.

17 Claims, 10 Drawing Sheets

IMAGE DISPLAY

This application is based upon and claims the benefit of priority from Japanese Patent Application No. 2006-221498 filed on Aug. 15, 2006, the content of which is incorporated by reference.

BACKGROUND OF THE INVENTION

1. Field of the Invention

The present invention relates to a liquid crystal display element which can be operated in a display mode selected from a reflective display mode, a combined reflective/transmissive display mode, and a transmissive display mode, and an electric device which is equipped with the liquid crystal display element.

2. Description of the Related Art

In recent years, liquid crystal display devices which display screens using liquid crystal are utilized in every possible display device ranging from small display devices for portable telephones to large display devices for monitors, television sets and the like. A liquid crystal display device comprises liquid crystals sandwiched between two substrates, each of which is formed with electrodes, and displays an image by changing the alignment of the liquid crystal by a voltage applied between the substrates to adjust emitted light.

There exist three types of liquid crystal display devices. One is a transmissive liquid crystal display device which employs a back light for a light source, and displays an image through the liquid crystal layer. Another one is a reflective liquid crystal display device which employs external light such as illumination light, sun light or the like for a light source, and reflects the external light on a liquid crystal layer to display an image. The remaining one is a semi-transmissive liquid crystal display device which has a combination of better image quality inherent in the transmissive liquid crystal display device and higher visibility inherent in the reflective liquid crystal display device.

In particular, portable information terminals such as portable telephones, PDA (Personal Digital Assistance) and the like, which have become rapidly pervasive in recent years, are utilized not only indoors but also outdoors. In addition, they are utilized by day and night. Accordingly, high visibility is required for portable information terminals under any illumination environment. For this reason, the semi-transmissive liquid crystal display device has become prevalent in recent years because it is characterized by having high visibility.

Semi-transmissive liquid crystal display devices are generally divided into two types. One is an internal semi-transmissive type which comprises a reflecting plate within a liquid crystal layer to reflect incident light within the liquid crystal layer, as disclosed in JP1999-242226A from line 25 of column 23 on page 13 to line 19 of column 26 on page 14 and FIG. 1. The other one is an external semi-transmissive type which comprises a reflecting plate external to a liquid crystal layer to reflect incident light after it has passed through the liquid crystal layer. Currently, the internal semi-transmissive type is prevalent because the external semi-transmissive type suffers from parallax (double image) and resulting low visibility due to a substrate disposed between the reflecting plate and liquid crystal layer.

Referring to FIG. 1, an internal semi-transmissive liquid crystal element is illustrated in the cross-sectional view, where a pair of substrates 102a, 102b are disposed opposite to each other above back light source 109, and polarizing plates 101a, 101b are disposed on surfaces of substrates 102a, 102b opposite to their opposing surfaces, respectively. Also, the internal semi-transmissive liquid crystal element comprises reflective display unit 121 which comprises internal reflecting plate 120 in the form of a reflective electrode having ragged reflective surfaces, and transmissive display unit 122 which comprises electrode 103b, on substrate 102b which is disposed closer to back light source 109. Further on an opposing surface of substrate 102a, which opposes substrate 102b, electrode 103a is provided to extend across reflective display unit 120 and transmissive display unit 121, and liquid crystal layer 104 is encapsulated between two substrates 102a, 102b.

Specifically, an internal reflective semi-transmissive liquid crystal display device configured like the internal semi-transmissive liquid crystal element illustrated in FIG. 1 comprises reflective display unit 121 which comprises internal reflecting plate 120 for reflecting incident light from the outside into one pixel, and transmissive display unit 122 for transmitting light irradiated from back light source 109. In this way, reflected light and transmitted light can both be utilized for displaying an image.

It should be noted that reflective display unit 121 differs from transmissive display unit 122 as regards the appropriate thickness of a liquid crystal. As such, liquid crystal layer 104 is often formed in different thicknesses in the respective areas. In FIG. 1, insulating film 127 is disposed on substrate 102b in reflective display unit 121, and internal reflecting plate 120 is formed on insulating film 127 such that the spacing between internal reflecting plate 120 and opposing electrode 103a in reflective display unit 121 is smaller than the spacing between opposing electrodes 103a, 103b in transmissive display unit 122.

However, in the configuration as described above, since the reflecting plate is formed only in a part of one pixel, a dark display is produced using the reflection of external light, as compared with a reflective liquid crystal display device in which a reflecting plate extends across one pixel.

Thus, JP2002-23156A discloses a method of reversibly switching back and forth between a state which presents high light reflectivity and low transmittance and a state which presents high light transmittance and low light reflectivity, from line 14 of column 5 on page 4 to line 18 of column 7 on page 5 and in FIGS. 1 to 7. JP2004-69835A also discloses such a method from line 5 on page 5 to line 17 on page 10 and in FIGS. 1 to 2.

Referring to FIG. 2, a liquid crystal display device is illustrated in the cross-sectional view, where reflection control layer 108, polarizing plate 101b, glass 107, liquid crystal layer 104, color filter layer 106, color filter substrate 105, and polarizing plate 101a are laminated above back light source 109 in this listed order. Reflection control layer 108 is formed of three-layer laminate HPDLC (Holographic Polymer Dispersed Liquid Crystal) which takes advantage of Bragg reflection the reflectivity of which can be electrically switched. Color filter layer 106 comprises filters for transmitting only R (red), G (green), B (blue), respectively.

This liquid crystal display device can be switched between a reflective display and a transmissive display by reversibly switching reflection control layer 108 between the state which presents high light reflectivity and low transmittance, and the state which presents high light transmittance and low reflectivity. In this way, the liquid display device can provide a full color reflective display in a light environment, and a full color transmissive display in a dark environment.

Referring to FIG. 3, a liquid crystal display device is illustrated in the cross-sectional view, wherein polarized-light selection reflective layer 111, liquid crystal layer 112, polarizing plate 101b, glass 107, liquid crystal layer 110, color filter substrate 105, and polarizing plate 11a are laminated above back light source 109 in this listed order. Polarized-light selection reflective layer 111 reflects light of a particular linear polarization, and transmits light of linear polarization orthogonal to the above-mentioned linear polarization.

In a reflective display as illustrated in the left-hand cross-sectional view of FIG. 3, when a voltage is applied to liquid crystal layer 112 to align liquid crystal molecules of liquid crystal layer 112 perpendicularly to the layer surface, light incident on liquid crystal layer 112 does not change in polarization. Accordingly, the incident light is reflected by polarized-light selection reflective layer 111 for use in a reflective display.

On the other hand, as illustrated in the right-hand cross-sectional view of FIG. 3, when no voltage is applied to liquid crystal layer 112, liquid crystal molecules of liquid crystal layer 112 are aligned in parallel with the layer surface, and are also twisted in alignment. In this state, light incident on liquid crystal layer 112 rotates by 90°.

Accordingly, when external light passes through liquid crystal layer 112, the external light is transmitted through polarized-light selection reflective layer 111 and cannot be utilized for display. However, within light which reaches polarized-light selection reflective layer 111 from back light source 109, light which vibrates perpendicularly to the surface of the drawing sheet reflects on polarized-light selection reflective layer 111, while light which vibrates in parallel with the surface of the drawing sheet is transmitted through polarized-light selection reflective layer 111 and impinges on liquid crystal layer 112. The light which impinges on liquid crystal layer 112 has its polarization direction rotated by 90° by liquid crystal layer 112, and is not absorbed by but passes through polarizing plate 101*b*. Thus, when no voltage is applied to liquid crystal layer 112, the external light is utilized for transmissive display.

Also, JP1998-206844A discloses a display method which involves switching a semi-transmissive selective light reflection layer over an entire screen to one of a reflection mode and a transmission mode.

The techniques described in JP2002-23156A and JP2004-69835A are the techniques to switch the display device between the reflective display mode and transmissive display mode to improve reflectivity in a reflective display. However, the reflection control layer, or the reflecting plate made up of the second liquid crystal layer and polarized-light selection reflective layer, is disposed outside of the liquid crystal layer for displaying an image. This gives rise to a problem of parallax (double image) experienced in a display, causing a degradation in visibility in a reflective display.

On the other hand, in the method described in JP-1998-206844A, the selective light reflection layer, which is disposed over the screen, is semi-transmissive per se. This gives rise to difficulty in creating a suitable optical design for the reflective display unit and transmissive display unit.

Further, the foregoing techniques have a problem of the inability to select an optimal display mode under a variety of illumination conditions which differ from one use environment to another.

SUMMARY OF THE INVENTION

It is an object of the present invention to provide a liquid crystal display element which is capable of displaying a highly visible image under any illumination environment, and an electronic device which is equipped with the liquid crystal display element.

In the present invention configured as described above, voltages are applied to a transmissive display unit and a reflective display unit defined in one pixel of a reflection control element, independently of each other, to switch the liquid crystal display element to one of a transmissive display mode which involves setting the reflection control element into a transmissive state, setting the reflective display unit of the liquid crystal display layer into a dark state, and displaying an image in the transmissive display unit; a combined reflective/transmissive display mode which involves setting the reflection control element in a transmissive state, and displaying an image in the reflective display unit and transmissive display unit of the liquid crystal display layer; and a reflective display mode which involves setting the reflection control element into a reflective state, and displaying an image in the reflective display unit and transmissive display unit of the liquid crystal display layer.

In this way, an optimal display mode can be selected in accordance with a particular situation, such as outdoors or indoors, and the degree of light of day and night. Accordingly, a highly visible screen can be displayed under any illumination environment.

The above and other objects, features, and advantages of the present invention will become apparent from the following description with reference to the accompanying drawings which illustrate an example of the present invention.

DETAILED DESCRIPTION OF THE PREFERRED EMBODIMENTS

First Embodiment

Figure 1:
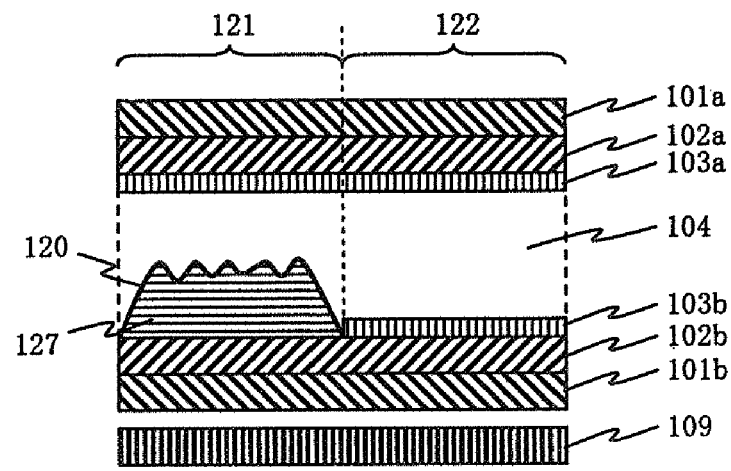
FIG. 1 is a cross-sectional view illustrating an exemplary internal semi-transmissive liquid crystal element for a general internal semi-transmissive liquid crystal display device.
Figure 2:
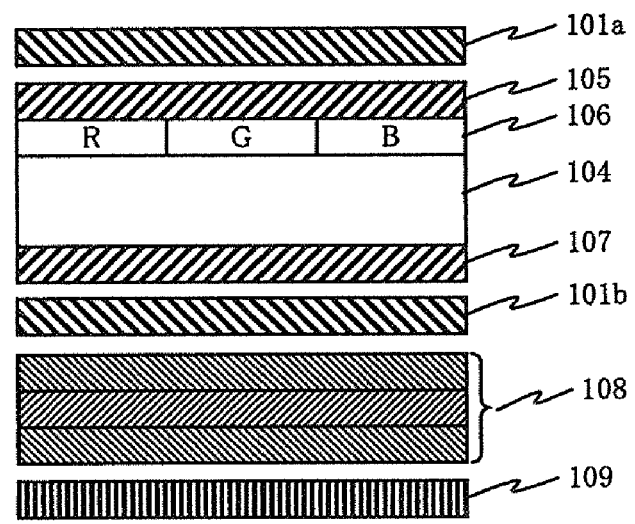
FIG. 2 is a cross-sectional view illustrating an exemplary liquid crystal display device which can be switched between a reflective display and transmissive display based on ambient light intensity.
Figure 3:
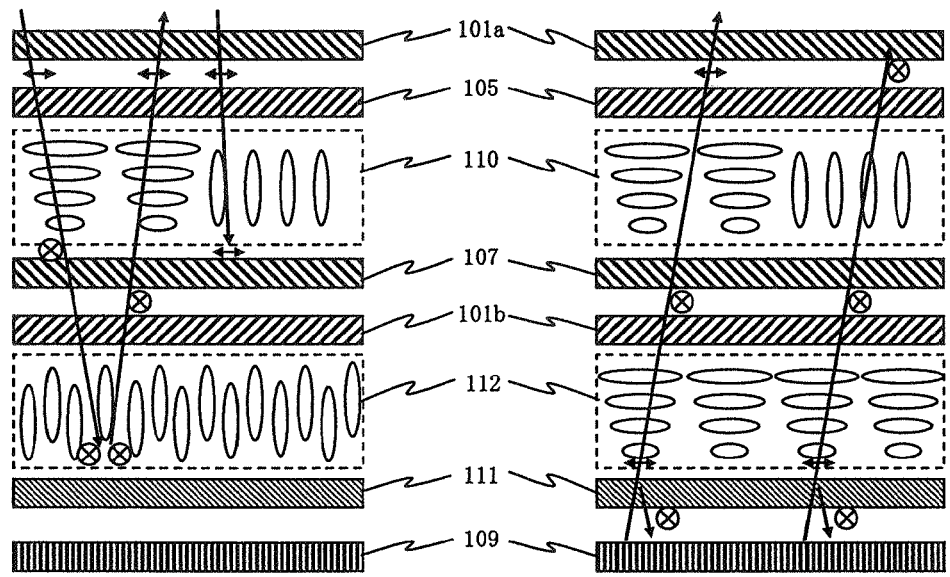
FIG. 3 is a cross-sectional view illustrating another exemplary liquid crystal display device which can be switched between a reflective display and transmissive display based on ambient light intensity.
Figure 4:
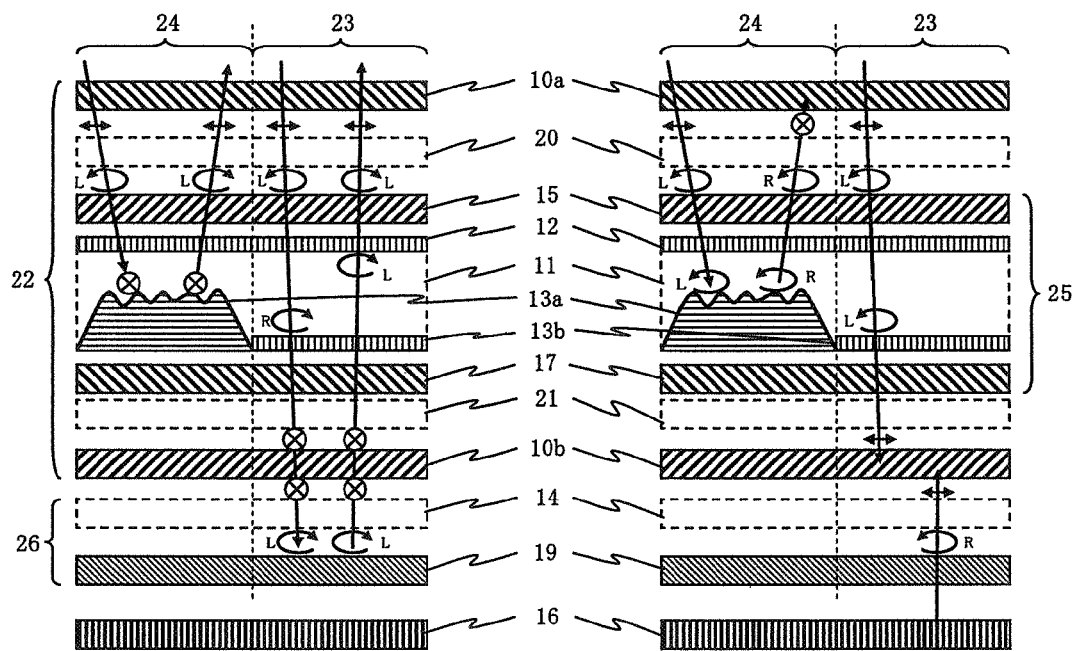
FIG. 4 is a diagram illustrating the configuration of a liquid crystal display element and display operations thereof in a reflective display mode according to a first embodiment of the present invention.
Figure 5:
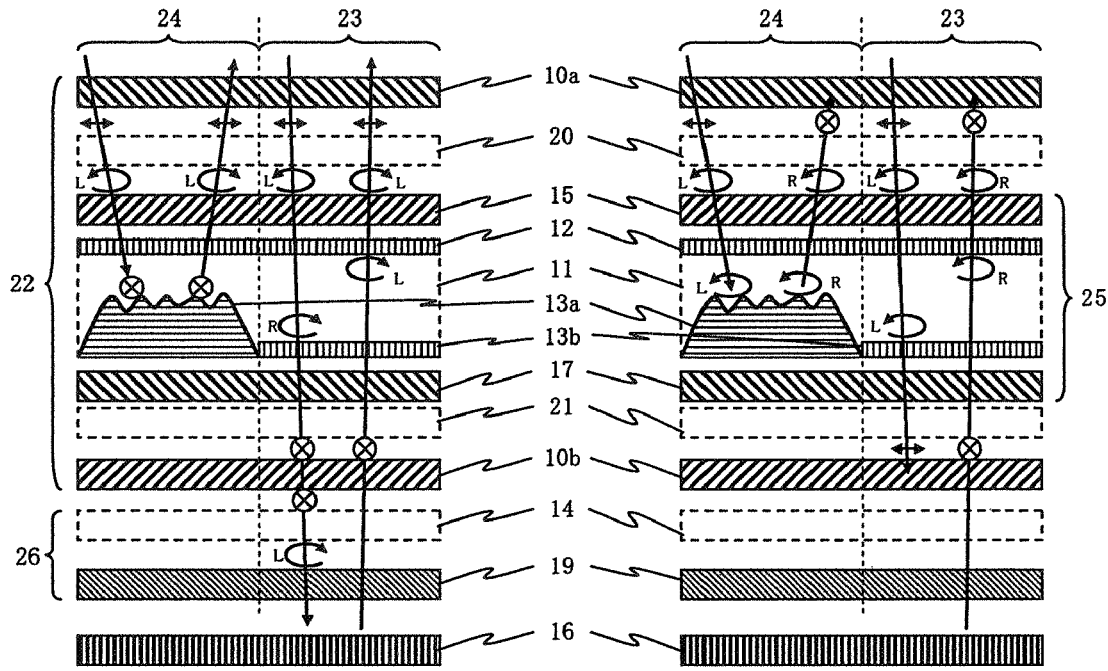
FIG. 5 is a diagram illustrating the configuration of the liquid crystal display element and display operations thereof in a combined reflective/transmissive display mode and a transmissive display mode according to the first embodiment of the present invention.

Referring to FIGS. 4 and 5, a liquid crystal display element according to a first embodiment is illustrated, where reflection control element 26 and liquid crystal display layer 22 are laminated in this order above back light source 16.

Back light source 16 may be any light source as long as it can illuminate liquid crystal display layer 22 from the back, such as a side-light type back light which includes a light source disposed on a side surface, a directly-underneath type back light which includes a light source disposed directly underneath an liquid crystal display element, an organic electroluminescent device, an inorganic electroluminescent device, and the like. Here, the side-light and directly-underneath type back light sources may include a cold cathode ray tube, white LED, LEDs of three primary colors, and the like. Preferably, back light source 16 can be manually or automatically controlled to irradiate an appropriate amount of light.

Reflection control element 26 comprises reflective layer 19, the reflectivity of which can be controlled by a voltage applied thereto, and phase control layer 14 for controlling the phase of reflective layer 19. Reflection control element 26 is made up of reflective layer 19 and phase control element 14 laminated in this order above back light source 16.

Reflective layer 19 comprises three sets, laminated one on another, of two transparent substrates, each of which is formed with a transparent electrode, and cholesteric liquid crystal sandwiched between the transparent substrates.

Figure 6:
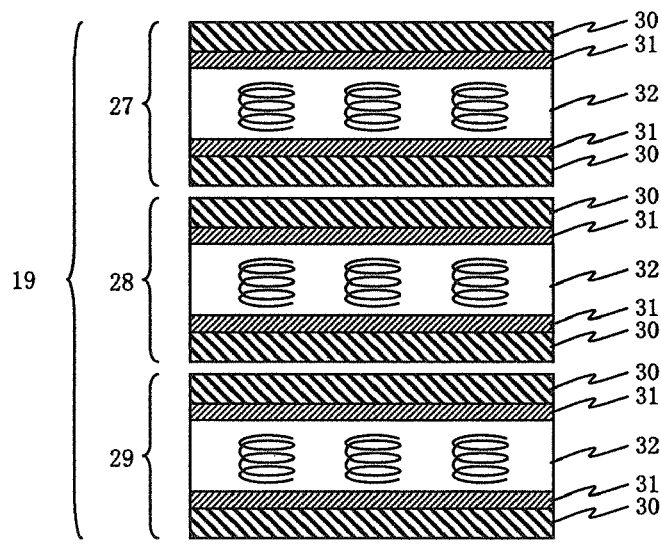
FIG. 6 is a diagram illustrating the structure of a reflective layer shown in FIGS. 4 and 5.

Referring to FIG. 6, reflective layer 19 shown in FIGS. 4 and 5 is illustrated, where reflective layer 19 comprises three layers of combinations, each of which comprises transparent substrate 30, transparent electrode 31, and left-handed spiral cholesteric liquid crystal 32.

Transparent substrate 30 used herein may be a glass substrate, a plastic film substrate or the like. Preferably, they are as thin as possible to eliminate parallax and have the least possible birefringence. However, even a birefringent substrate may be arranged such that its optical axis matches the optical axis of a polarizing plate, a phase plate or the like to substantially cancel out the birefringence. Alternatively, an optical compensation design may be actively made taking into consideration of the birefringence of a substrate.

Also, transparent electrode 31 formed herein may be made of indium tin oxide (ITO) or may be tin oxide (TO) based, zinc oxide (ZnO) based, cadmium tin oxide (CTO) based thin films, and the like. However, not limited to those, any thin film can be used provided that it is transparent and electrically conductive.

Left-handed spiral cholesteric liquid crystal 32 comprises three layers, all of which are left-handed spiral and have spiral pitches to Bragg reflection left-hand circularly polarized light in particular wavelength ranges of visible light, respectively. Specifically, the three layers are designed to have spiral pitches of 281.25 nm, 343.75 nm, and 393.75 nm, respectively, such that peak wavelengths are found at 450 nm, 550 nm, and 630 nm in the respective layers. Here, left-handed spiral cholesteric liquid crystal 32 has an average refractive index of 1.6, and the refractive index difference between an abnormal light refractive index and a normal light refractive index is 0.2. However, the spiral pitches are not limited to those mentioned above, but any spiral pitches may be applied as long as they are equal to or less than 780 nm.

In this embodiment presently described, cholesteric liquid crystal 32 is limited to be left-handed spiral, but right-handed spiral cholesteric liquid crystal may also be used to produce similar effects by adjusting phase control layer 14.

In this way, left-hand circularly polarized light can be Bragg reflected over the entire wavelength range of visible light. Also, cholesteric liquid crystal 32 can be varied from a Bragg reflective state to a transmissive state by applying a voltage between transparent electrodes 31.

In the structure illustrated in FIG. 6, blue reflective layer 27 for Bragg reflecting blue light, green reflective layer 28 for Bragg reflecting green light, and red reflective layer 29 for Bragg reflecting red light are laminated in this order from above on the surface of the drawing sheet. However, the lamination is not limited to this order, but the layers may be laminated in any order such as in the order of blue reflective layer 27, red reflective layer 29, and green reflective layer 28, in the order of green reflective layer 28, blue reflective layer 27, and red reflective layer 29, or the like.

Further, the respective layers may be adhered to one another by a transparent adhesive layer or the like. In this way, reflection can be reduced at interfaces between the respective layers.

Alternatively, transparent electrodes may be formed on both surfaces of single transparent substrate 30 to share transparent electrode 30 which is present on the interfaces of the respective layers. This can reduce reflection on the interface between the respective layers and reduce the thickness of the respective layers.

Figure 7:
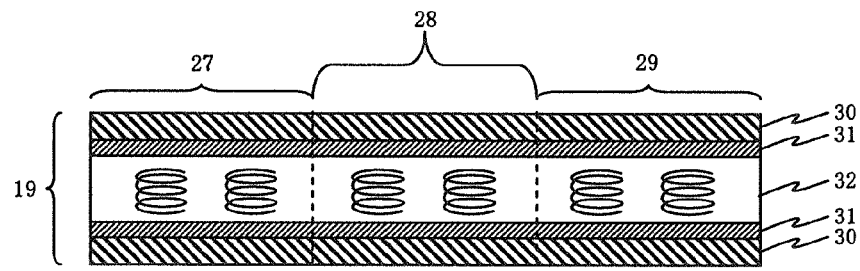
FIG. 7 is a diagram illustrating an exemplary structure of the reflective layer, illustrated in FIG. 6, which comprises a blue reflective layer, a green reflective layer, and a red reflective layer which are disposed in one plane.

Referring to FIG. 7, an exemplary structure of reflective layer 19 is illustrated, where blue reflective layer 27, green reflective layer 28, and red reflective layer 29 shown in FIG. 6 are disposed in one plane.

As illustrated in FIG. 7, any structure may be applied as long as it can reflect light over the entire wavelength range of visible light on a pixel-by-pixel basis, such as a structure in which respective color reflective layers are disposed in one plane, or a structure in which a planar disposition is combined with the laminate structure as described above.

Further, liquid crystal for use in reflective layer 19 may include surface stable cholesteric liquid crystal comprised of cholesteric liquid crystal and polymer network, polymer stable cholesteric liquid crystal, and the like. Such liquid crystal facilitates an increase in wavelength band in which light is Bragg reflected, and in which Bragg reflection is oriented toward the front direction.

Reflective layer 19, the reflectivity of which is controlled by a voltage applied to reflection control element 26, includes cholesteric liquid crystal. Alternatively, reflective layer 19 comprises alternate lamination of liquid crystal droplet layers including liquid crystal droplets and at least one polymer layer. Further alternatively, reflective layer 19 includes a polymer layer which includes cholesteric liquid crystal droplets. In this way, reflection control element 26 can control the reflectivity of reflective layer 19 to switch between a transmissive state and a reflective state.

Figure 8:
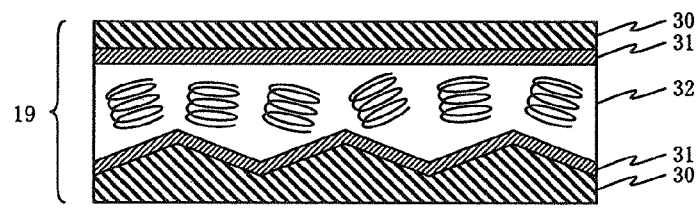
FIG. 8 is a diagram illustrating an exemplary structure of the reflective layer on a ragged transparent substrate illustrated in FIGS. 6 and 7.

Alternatively, as illustrated in FIG. 8, raggedness may be formed on one of transparent substrates 30 which sandwich left-handed spiral cholesteric liquid crystal 32. This can randomize the spiral axis of left-handed spiral cholesteric liquid crystal 32 to facilitate a change of Bragg reflection toward the front direction.

Phase control layer 14 shown in FIGS. 4 and 5 comprises a uniaxial phase difference plate which has a phase difference equal to one quarter wavelength over the entire wavelength range of visible light, or a biaxial phase difference plate. Also, the optical axis is defined to convert linearly polarized light emitted from polarizing plate 10b into generally left-hand circularly polarized light, and to convert generally left-hand circularly polarized light reflected on reflective layer 19 into linearly polarized light which matches the transmission axis of polarizing plate 10b. However, a plurality of uniaxial phase difference plates, or a plurality of biaxial phase difference plates, or a combination of pluralities of uniaxial phase difference plates and biaxial phase difference plates may be employed in order to make the phase difference equal to one quarter wavelength over the entire wavelength range of visible light.

Liquid crystal display layer 22 shown in FIGS. 4 and 5 comprises polarizing plate 10b, phase compensation layer 21, liquid crystal layer 25, phase compensation layer 20, and polarizing plate 10a, laminated in this order from back light source 16. Polarizing plate 10a has a transmission axis extending in a left-to-right direction on the surface of the drawing sheet, while polarizing plate 10b has a transmission axis extending in a direction perpendicular to the surface of the drawing sheet, so that they are in a cross nicol arrangement. However, the optical axes of polarizing plate 10a and polarizing plate 10b may be shifted from the cross nicol arrangement due to the relationship in phase difference between phase compensation layer 20 and phase compensation layer 21.

Phase compensation layer 20 shown in FIGS. 4 and 5 comprises a uniaxial phase difference plate or a biaxial phase difference plate which has a phase difference substantially equal to one quarter wavelength in order to generally circularly polarize linearly polarized light which is incident thereon from polarizing plate 10a.

Phase compensation layer 21 shown in FIGS. 4 and 5 comprises a uniaxial phase difference plate or a biaxial phase difference plate which has a phase difference substantially equal to one quarter wavelength in order to generally circularly polarize linearly polarized light which is incident thereon from polarizing plate 10b. However, phase compensation layers 20, 21 may each comprise a plurality of uniaxial phase difference plates, or a plurality of biaxial phase difference plates, or a combination of pluralities of uniaxial phase difference plates and biaxial phase difference plates in order to make the phase difference equal to one quarter wavelength over the entire wavelength range of visible light.

In this embodiment, linearly polarized light incident from polarizing plate 10a is left-hand circularly polarized by phase compensation layer 20. On the other hand, the linearly polarized light incident from polarizing plate 10b is right-hand circularly polarized by phase compensation layer 21.

Liquid crystal layer 25 shown in FIGS. 4 and 5 comprises substrate 17, reflecting plate 13a including electrode or transparent electrode 13b, liquid crystal 11, transparent electrode 12, and substrate 15 in this order from back light source 16. Substrates 15, 17 are transparent. Here, an alignment film for aligning liquid crystal 11, and a color filter layer are omitted for simplifying the description. Further, transmissive display unit 23 and reflective display unit 24 are defined within one pixel, as shown in FIG. 4. Reflecting plate 13a including an electrode and transparent electrode 13b drive reflective display unit 24 and transmissive display unit 23 independently of each other.

The ratio of transmissive display unit 23 to reflective display unit 24 may be changed as appropriate in accordance with specifications of a particular liquid crystal display element.

Reflecting plate 13a including an electrode is formed with raggedness on the surface with resin or the like, and is covered with a metal film such as aluminum, silver or the like. In this way, incident external light is reflected in a direction shifted from a regular reflection direction, such that it is reflected in the front direction as much as possible.

Liquid crystal 11 shown in FIGS. 4 and 5 has a thickness which results in a phase difference equal to approximately one quarter wavelength in reflective display unit 24 and a thickness which results in a phase difference equal to approximately one half wavelength in transmissive display unit 23, when no voltage is applied. Specifically, the height of the raggedness is set such that reflective display unit 24 has a thickness one half as much as that of transmissive display unit 23. However, the thicknesses are not so limited. For example, reflecting plate 13a including electrode and transparent electrode 13b on substrate 17 may be made uniform in thickness, and the color filter layer on substrate 15 may be adjusted in height such that reflective display unit 24 has a thickness one half as much as that of transmissive display unit 23.

Further, the alignment of liquid crystal may be in any configuration such as homogeneous alignment, twisted alignment, homeotropic alignment, hybrid alignment and the like, as long as it converts left-hand circularly polarized light emitted from phase compensation layer 20 into linearly polarized light orthogonal to linearly polarized light emitted from polarizing plate 10a in reflective display unit 24, and converts left-hand circularly polarized light emitted from phase compensation layer 20 into right-hand circularly polarized light in transmissive display unit 23.

A display scheme for liquid crystal display layer 22 is not limited to a vertical electric field scheme as employed in this embodiment. Even a lateral electric field scheme may be employed instead as long as the phase difference is changed by one quarter wavelength or more in reflective display unit 24 and by one half wavelength or more in transmissive display unit 23 by applying a voltage, as compared with the phase difference when no voltage is applied. Specifically, suitable display schemes include a twisted nematic (TN) mode and a super twisted nematic (STN) mode, which belong to the vertical electric field scheme, vertical alignment modes such as a vertical alignment scheme which utilizes vertical alignment (VA scheme), a domain patterned vertical alignment scheme (PVA scheme), an advanced super V (ASV scheme), and the like, a film compensation mode which employs an anisotropic optical film to perform optical compensation, and an ECB mode which take advantage of an electric field birefringence effect such as homogeneous alignment, hybrid alignment and the like. Also, the horizontal electric field scheme includes an in-plane switch (IPS) scheme, and a fringe field switching (FFS) scheme. However, when the horizontal electric field scheme is employed, transparent electrode 12 must be removed from substrate 15, and a pixel electrode and a common electrode must be formed on substrate 17 to move the liquid crystal within a plane.

Next, display operations of the liquid crystal display element according to this embodiment will be described in detail with reference to FIGS. 4 and 5.

First, display operations in a reflective display mode will be described with reference to FIG. 4. In the reflective display mode of this embodiment, reflection control element 26 is brought into a reflective state. Also, the same voltage is applied to reflective display unit 24 and transmissive display unit 23 in synchronization.

As illustrated in the left-hand cross-sectional view of FIG. 4, non-polarized external light incident on polarizing plate 10a is transmitted through polarizing plate 10a, and converted into linearly polarized light which travels in the left-to-right direction on the surface of the drawing sheet. This linearly polarized light passes through phase compensation layer 20, which causes the polarization to rotate by one quarter wavelength, with the result that the linearly polarized light is converted into left-hand circularly polarized light.

Subsequently, the left-hand circularly polarized light incident on reflective display unit 24 is converted into linearly polarized light in the direction perpendicular to the surface of the drawing sheet, with its phase being rotated by the phase difference (one quarter wavelength) of liquid crystal 11 when it is not applied with a voltage. Then, the linearly polarized light is reflected on reflecting plate 13a including an electrode. In this event, the linearly polarized light is reflected in a direction perpendicular to the surface of the drawing sheets without changing the polarization direction, due to the nature of linearly polarized light.

The reflected linearly polarized light is again converted into left-hand circularly polarized light by liquid crystal 11 with its phase being rotated by one quarter wavelength, and the left-hand circularly polarized light is converted into linearly polarized light in the left-to-right direction on the surface of the drawing sheet by phase compensation layer 20. Since this linearly polarized light matches the transmission axis of polarizing plate 10a, the linearly polarized light passes through polarizing plate 10a without being absorbed thereby. Accordingly, the resulting image is displayed in a bright state.

On the other hand, when a voltage is applied to liquid crystal 11 to substantially eliminate the phase difference of the liquid crystal, as illustrated in the right-hand cross-sectional view of FIG. 4, left-hand circularly polarized light incident on liquid crystal 11 impinges on reflecting plate 13a including an electrode without changing its polarization state. As the left-hand circularly polarized light reflects on reflecting plate 13a, the left-hand circularly polarized light is converted into right-hand circularly polarized light. The converted right-hand circularly polarized light passes through liquid crystal 11 as it is, and impinges on phase compensation layer 20. Then, the right-hand circularly polarized light is converted into linearly polarized light in the direction perpendicular to the surface of the drawing sheet by phase compensation layer 20 with its phase being rotated by one quarter wavelength. Since this linearly polarized light is orthogonal to the transmission axis of polarizing plate 10a, the linearly polarized light is absorbed by polarizing plate 10a. Accordingly, the resulting image is displayed in a dark state.

Also, the phase difference of liquid crystal 11 can be changed from one quarter wavelength to substantially zero wavelength by applying a voltage. In this way, the left-hand circularly polarized light incident on liquid crystal 11 can be changed from linearly polarized light in a direction perpendicular to the surface of the drawing sheet when no voltage is applied, through elliptically polarized light, to left-hand circularly polarized light depending on the phase difference of liquid crystal 11. Thus, a half-tone display can be accomplished by the applied voltage.

In transmissive display unit 23, in turn, incident left-hand circularly polarized light is converted into right-hand circularly polarized light with its phase being rotated by the phase difference (one half wavelength) of liquid crystal 11 when it is not applied with a voltage. Subsequently, the right-hand circularly polarized light is converted into linearly polarized light in a direction perpendicular to the surface of the drawing sheet by phase compensation layer 21 with its phase being rotated by one quarter wavelength. Since this linearly polarized light matches the transmission axis of polarizing plate 10b, the linearly polarized light passes through polarizing plate 10b without being absorbed thereby. The linearly polarized light, after passing through polarizing plate 10b, is converted into left-hand circularly polarized light due to the phase difference of phase control layer 14. Then, since the left-handed spiral cholesteric liquid crystal in reflective layer 19 is in the reflective state, the left-hand circularly polarized light is reflected on reflecting plate 19 without changing its polarization state.

As the reflected left-hand circularly polarized light again impinges on phase control layer 14, the left-hand circularly polarized light is converted into linearly polarized light in a direction perpendicular to the surface of the drawing sheet. Since this linearly polarized light matches the transmission axis of polarizing plate 10b, the linearly polarized light passes through polarizing plate 10b without being absorbed thereby. The linearly polarized light, after passing polarizing plate 10b, is converted into right-hand circularly polarized light by phase compensation layer 21. Subsequently, the right-hand circularly polarized light is converted into left-hand circularly polarized light by liquid crystal 11 with its phase being rotated by one half wavelength. The left-hand circularly polarized light is converted into linearly polarized light in the left-to-right direction on the surface of the drawing sheet by phase compensation layer 20 with its phase being rotated by one quarter wavelength. Since this linearly polarized light matches the transmission axis of polarizing plate 10a, the linearly polarized light passes through polarizing plate 10a without being absorbed thereby. Accordingly, when no voltage is applied to the liquid crystal, the resulting image is displayed in a bright state.

In this way, brighter images can be produced in the reflective display mode by making use of external light incident on transmissive display unit 23, which has not been conventionally utilized, in the reflective display mode. While parallax occurs due to the thickness of the substrate in transmissive display unit 23, the parallax does not extend over the entire screen as before. It is therefore possible to improve visibility (parallax (double image) which has been a challenge in the related art.

Also, when a voltage is applied to liquid crystal 11 in transmissive display unit 23 in a manner similar to reflective display unit 24 to substantially eliminate the phase difference from the liquid crystal, as illustrated in the right-hand cross-sectional view of FIG. 4, left-hand circularly polarized light incident on liquid crystal 11 impinges on phase compensation layer 21 without changing its polarization state. Then, the left-hand circularly polarized light is converted into linearly polarized light in the left-to-right direction on the surface of the drawing sheet by phase compensation layer 21 with its phase being rotated by one quarter wavelength. Since this linearly polarized light is orthogonal to the transmission axis of polarizing plate 10*b*, the linearly polarized light is absorbed thereby. Accordingly, a resulting image is displayed in a dark state.

In this way, the phase difference of liquid crystal 11 can be changed from one half wavelength to substantially zero wavelength by applying a voltage to liquid crystal 11. Thus, the left-hand circularly polarized light incident on liquid crystal 11 can be reversibly changed from right-hand circularly polarized light, when no voltage is applied, to left-hand circularly polarized light depending on the phase difference of liquid crystal 11. Thus, a half-tone display can be accomplished by the applied voltage.

As described above, both reflective display unit 24 and transmissive display unit 23 normally provide a white display in the reflective display mode of the liquid crystal display element according to this embodiment, and half-tone display can be made in both areas by applying the same voltage thereto.

Here, as back light source 16 is driven to emit light as illustrated in the right-hand cross-sectional view of FIG. 4, right-hand circularly polarized light is transmitted through reflective layer 19 of reflection control element 26. The transmitted right-hand circularly polarized light is converted into linearly polarized light in the left-to-right direction on the surface of the drawing sheet by phase control layer 14 with its phase being rotated by one quarter wavelength. Since this linearly polarized light is orthogonal to the transmission axis of polarizing plate 10*b*, the linearly polarized light is absorbed thereby and is not utilized for display.

Accordingly, back light source 16 need not be driven to emit light in the reflective display mode of the liquid crystal display element according to this embodiment. In other words, back light source 16 is preferably kept from emitting light so that liquid crystal display layer 22 is not irradiated with light. In this way, power consumed by back light source 16 can be eliminated to contribute to a reduction in power consumption of the liquid crystal display element.

Next, display operations in a combined reflective/transmissive display mode in the liquid crystal display element according to this embodiment will be described in detail with reference to FIG. 5. In this display mode, reflection control element 26 is utilized in a transmissive state. Also, the same voltage is applied to reflective display unit 24 and transmissive display unit 23 in synchronization. Further, back light source 16 is kept irradiating light.

The display operations in reflective display unit 24 illustrated in the left-hand cross-sectional view of FIG. 5 and in the right-hand cross-sectional view of FIG. 5 are similar to the display operations in reflective display unit 24 described in connection with FIG. 4.

On the other hand, in regard to transmissive display unit 23 shown in FIG. 5, non-polarized external light incident on polarizing plate 10*a* is converted into linearly polarized light in the left-to-right direction on the surface of the drawing sheet as it is through polarizing plate 10*a*. This linearly polarized light is converted into left-hand circularly polarized light by passing through phase compensation layer 20, with its phase being rotated by one quarter wavelength.

The converted left-hand circularly polarized light is again converted into right-hand circularly polarized light with its phase being rotated by the phase difference (one half wavelength) of liquid crystal 11 when no voltage is applied thereto. Then, the right-hand circularly polarized light is converted into linearly polarized light in the direction perpendicular to the surface of the drawing sheet by phase compensation layer 21 with its phase being rotated by one quarter wavelength. The resulting linearly polarized light passes through polarizing plate 10*b*.

The linearly polarized light, which has passed through polarizing plate 10*b*, is converted into left-hand circularly polarized light due to the phase difference of phase control layer 14, and impinges on reflective layer 19 of reflection control element 26. Since reflective layer 19 is in a transmissive state, the left-hand circularly polarized light incident thereon is transmitted through reflective layer 19 as it is. Accordingly, external light incident on transmissive display unit 23 is not utilized for display.

On the other hand, light irradiated from back light source 16 is transmitted through reflection control element 26 without polarization, impinges on polarizing plate 10*b*, is converted into linearly polarized light in a direction perpendicular to the surface of the drawing sheet, and is transmitted through polarizing plate 10*b*.

The transmitted linearly polarized light is converted into right-hand circularly polarized light by phase compensation layer 21, and is converted into left-hand circularly polarized light by liquid crystal 11 with its phase being rotated by one half wavelength. Further, the left-hand circularly polarized light is converted into linearly polarized light in the left-to-right direction on the surface of the drawing sheet by phase compensation layer 20 with its phase being rotated by one quarter wavelength. Since this linearly polarized light matches the transmission axis of polarizing plate 10*a*, the linearly polarized light passes through polarizing plate 10*a* without being absorbed thereby. Accordingly, the resulting image is displayed in a bright state, similar to the display in reflective display unit 24.

On the other hand, as a voltage is applied to liquid crystal 11 in transmissive display unit 23 in a manner same as reflective display unit 24, a phase difference is substantially eliminated between external light and liquid crystal 11, as illustrated in the right-hand cross-sectional view, so that left-hand circularly polarized light incident on liquid crystal 11 impinges on phase compensation layer 21 without changing its polarization state. Then, the left-hand circularly polarized light is converted into linearly polarized light in the left-to-right direction on the surface of the drawing sheet by phase compensation layer 21 with its phase being rotated by one quarter wavelength. Since this linearly polarized light is orthogonal to the transmission axis of polarizing plate 10*b*, the linearly polarized light is absorbed thereby. Accordingly, the external light incident on transmissive display unit 23 is not utilized for display.

Light irradiated from back light source 16 in turn is transmitted through polarizing plate 10b, and converted into linearly polarized light in a direction perpendicular to the surface of the drawing sheet. Then, the linearly polarized light is converted into right-hand circularly polarized light by phase compensation layer 21, and impinges on liquid crystal 11. In this event, since there is no phase difference in liquid crystal 11, the right-hand circularly polarized light passes through liquid crystal layer 25 without changing its polarization state. Then, the right-hand circularly polarized light is converted into linearly polarized light in a direction perpendicular to the surface of the drawing sheet by phase compensation layer 20 with its phase being rotated by one quarter wavelength. Since this linearly polarized light is orthogonal to the transmission axis of polarizing plate 10a, the linearly polarized light is absorbed thereby. This results in a dark display as is the case with the display operation in reflective display unit 24.

Also, from the fact that in the display operations in transmissive display unit 23, light irradiated from back light source 16, after passing through polarizing plate 10b of liquid display layer 22, is similar in polarization state to that in transmissive display unit 23 in the reflective display mode of this embodiment, the half-tone display also presents display operations similar to those in the reflective display mode of this embodiment.

In this way, by bringing reflection control element 26 into a transmissive state, reflective display unit 24 is set into a reflective display mode making use of external light, while transmissive display unit 23 is set into a transmissive display mode making use of back light, thus providing for the combined reflective/transmissive display mode.

Here, by changing the ratio of reflective display unit 24 to transmissive display unit 23 in a pixel, it is possible to set a combined reflective/transmissive display mode which places importance on the reflection, or to set a combined reflective/transmissive display mode which places importance on the transmission.

When an ambient environment is light, the reflectivity of reflection control element 26 may be controlled to set the same into a reflection/transmissive state, such that the reflection in reflection control element 26 is utilized for displaying an image. Here, the amount of light irradiated from back light source 16 may be controlled to be reciprocally proportional to the reflectivity of reflection control element 26. In this way, the use efficiency of back light can be optimized, thus making it possible to reduce power consumption of the liquid crystal display element.

Next, display operations in a transmissive display mode in the liquid crystal display element according to this embodiment will be described with reference to FIG. 5.

As illustrated in the right-hand cross-sectional view of FIG. 5, in the transmissive display mode, reflection control element 26 is set into a transmissive state, back light source 16 is kept irradiating light, and a voltage is applied to reflective display unit 24 of liquid crystal display layer 22 to maintain reflective display unit 24 in a dark state at all times so that it is not utilized for display. In this way, the liquid crystal display element according to this embodiment can utilize only transmissive display unit 23 of liquid crystal display layer 22 which is not applied with a voltage in the display operations, as illustrated in the left-hand cross-sectional view.

The display operations involve the same operations as those performed in transmissive display unit 23 of liquid crystal display layer 22 in the aforementioned combined reflective/transmissive display mode. In this way, since light irradiated from back light source 16 alone is utilized for displaying an image, the image can be displayed at a high image quality which is a characteristic of the transmissive liquid crystal display.

Here, if reflective display unit 24 and transmissive display unit 23 of liquid crystal display layer 22 are driven independently of each other to cause defective alignment of the liquid crystal near the boundary therebetween to adversely affect the image quality, a light shielding layer may be provided near the boundary on substrate 15.

As described above, the liquid crystal display element according to this embodiment can be operated in the most suitable display mode selected in accordance with a particular environment established by a used illumination. In particular, in the reflective display mode, transmissive display unit 23 within a pixel can be used for displaying an image. In this way, it is possible to improve low visibility due to parallax (double image), which has been a challenge for the related art, simultaneously with the provision of a bright image displayed through reflection.

Here, while the display mode can be manually switched, a display mode selection block may be provided within the liquid crystal display element for sensing the amount of external light irradiated to the liquid crystal display element using a photo-sensor to automatically select an optimal display mode.

Figure 9:
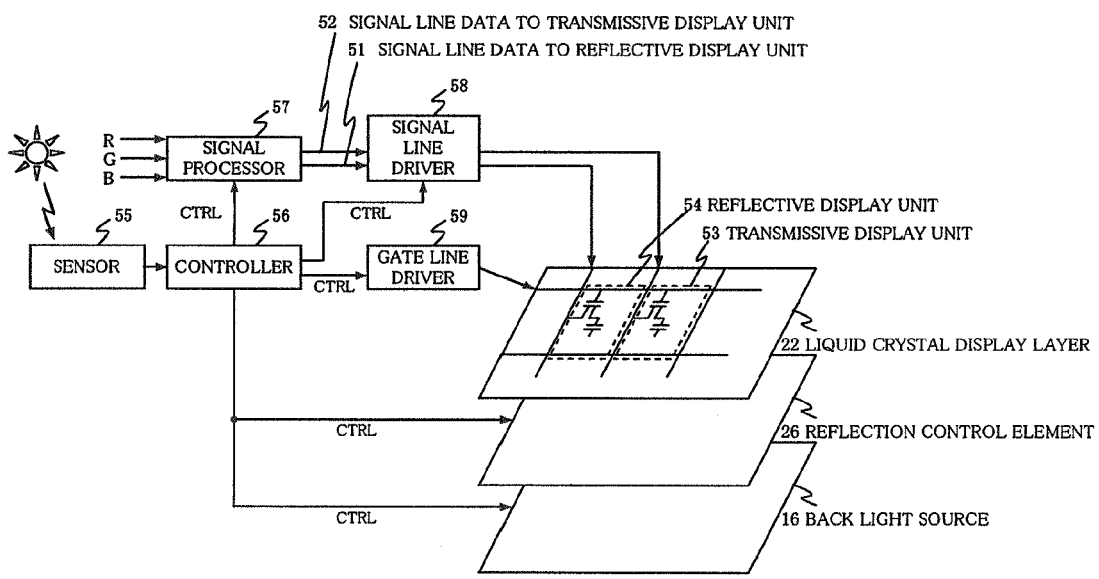
FIG. 9 is a diagram illustrating an exemplary display mode selection block for automatically selecting an optimal display mode.

Referring to FIG. 9, an exemplary display mode selection block is illustrated for automatically selecting an optimal display mode. The block comprises sensor 55, controller 56, signal processor 57, signal line driver 58, and gate line driver 59. Sensor 55 senses the amount of external light. Controller 56 controls a clock and a timing of synchronization. Signal processor 57 processes RGB input signals for serial-to-parallel conversion and the like. Signal line driver 58 supplies liquid crystal display layer 22 with signal line data 51 processed by signal processor 57 and directed to the reflective display unit of the pixel and signal line data 52 directed to the transmissive display unit of the pixel. Gate line driver 59 supplies liquid crystal display layer 22 with a control signal which is controlled by controller 56. These components are associated with liquid crystal display layer 22 to display an image. Further, in this embodiment, source lines are provided for applying source signals, independently of each other, to reflective display unit 54 of one pixel and to transmissive display unit 53 of one pixel in liquid crystal display layer 22, while a gate line is used in common.

However, the display mode selection block is not limited to the configuration illustrated in FIG. 9, but gate lines may be provided for reflective display unit 54 and transmissive display unit 53 independently of each other, while a source line may be used in common. In this alternative, a display signal is written into reflective display unit 54 at a first timing, and a display signal is written into transmissive display unit 53 at a second timing. In this way, independent display signals can be written into reflective display unit 54 and transmissive display unit 53.

For setting each display mode, a signal is supplied to controller 56 in accordance with the amount of external light sensed by sensor 55. In response to this signal, controller 56 supplies a control signal to signal processor 57, back light source 16, reflection control element 26, gate line driver 59, and signal line driver 58. Based on this control signal, a selection is made as to whether or not back light source 16 is driven to irradiate light. Another selection is made as to whether reflection control element 26 is set into a reflective state or a transmissive state. Also, signal processor 57 determines whether or not reflective display unit 54 and transmissive display unit 53 of liquid crystal display layer 22 are utilized for displaying an image. Then, signal processor 57 supplies source signals to reflective display unit 54 and transmissive display unit 53, respectively, through signal line driver 58. Also, a gate signal is supplied from gate line driver 59. Then, a display state is determined for each of reflective display unit 54 and transmissive display unit 53 in each pixel of liquid crystal display layer 22.

Specifically, in the reflective display mode, after the amount of external light is sensed by sensor 55, back light source 16 is not driven to irradiate back light, reflection control element 26 is set into the reflective state, and reflective display unit 54 and transmissive display unit 53 of liquid crystal display layer 22 are both utilized for display. On the other hand, in the combined reflective/transmissive display mode, back light source 16 is driven to irradiate back light, reflection control element 26 is set into the transmissive state, and reflective display unit 54 and transmissive display unit 53 of liquid crystal display layer 22 are both utilized for display. Then, in the transmissive display mode, back light source 16 is driven to irradiate back light, reflection control element 26 is set into the transmissive state, and transmissive display unit 53 of liquid crystal display layer 22 is utilized for display. In this way, an appropriate display mode can be automatically selected on the basis of the sensed amount of external light.

Alternatively, in the combined reflective/transmissive display mode, the reflectivity of reflection control element 26 may be controlled in accordance with the amount of external light sensed by a photo-sensor or sensor 55, and the amount of light irradiated from back light source 16 may be controlled to be reciprocally proportional to the reflectivity of reflection control element 26. In this way, a display mode can be finely set in accordance with an illumination used therefor and an environment in which it is used.

Here, the photo-sensor, i.e., sensor 55 is disposed on the liquid crystal display element according to this embodiment. For example, a photo-diode is formed on substrate 10b of the liquid crystal display element making use of a process of forming an active element, i.e., a thin film transistor (TFT) or the like. Thus, the amount of external light can be monitored by measuring a photoelectromotive force of the photo-diode formed on the liquid crystal display element. The photo-sensor is not limited to the foregoing, but any sensor may be employed as long as it can be mounted on the liquid crystal display element, for example, a photo-transistor which takes advantage of photovoltaic effects, a cadmium sulfide cell (CdS cell) which takes advantage of the photo-conductive effect, and the like.

Second Embodiment

Figure 10:
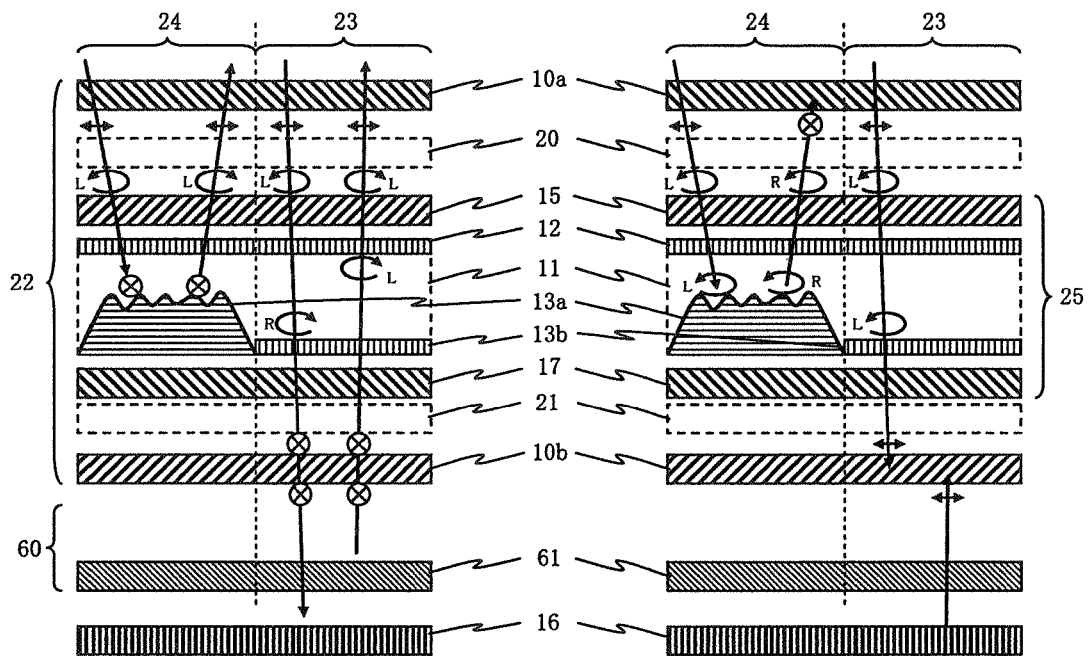
FIG. 10 is a diagram illustrating the configuration of a liquid crystal display element and display operations thereof in a reflective display mode according to a second embodiment of the present invention.
Figure 11:
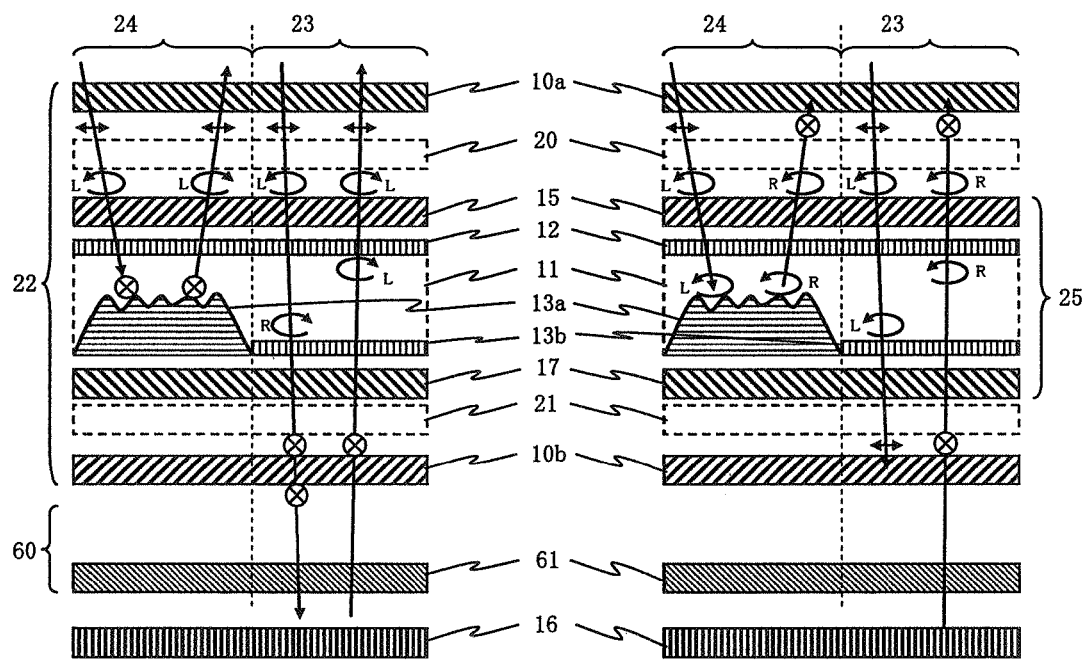
FIG. 11 is a diagram illustrating the configuration of the liquid crystal display element and display operations thereof in a combined reflective/transmissive display mode and a transmissive display mode according to the second embodiment of the present invention.

A second embodiment differs from the first embodiment in that reflection control element 60 comprises reflective layer 61 which is made of an alignment type holographic polymer dispersion liquid crystal (PDLC), which Bragg reflects linearly polarized light whose reflectivity can be controlled by a voltage applied thereto, as illustrated in FIGS. 10 and 11. The configuration in this embodiment except for the foregoing is the same as the first embodiment.

Figure 12:
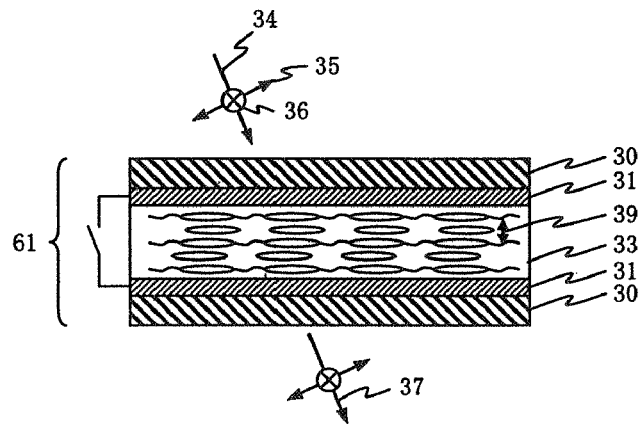
FIG. 12(a) is a diagram illustrating an exemplary structure of a reflective layer shown in FIGS. 10 and 11 when no voltage is applied to the reflective layer.
FIG. 12(b) is a diagram illustrating an exemplary structure of the reflective layer shown in FIGS. 10 and 11 when a voltage is applied to the reflective layer.
Figure 12:
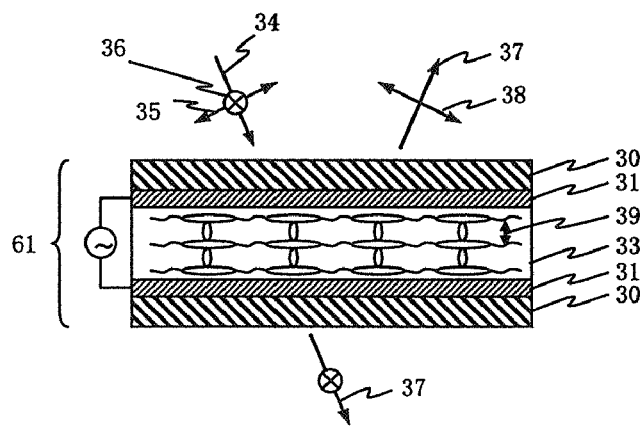

Referring to FIGS. 12(a) and 12(b), reflective layer 61 shown in FIGS. 10 and 11 is illustrated, where reflective layer 61 comprises transparent substrate 30, transparent electrode 31, and a liquid crystal layer 33 made up of an alternate lamination of liquid crystal and polymerized liquid crystal monomer. This reflective layer 61 receives incident light 34 such as linearly polarized light 35 in the left-to-right direction on the surface of the drawing sheet and linearly polarized light 35 in a direction perpendicular to the surface of the drawing sheet, and emits outgoing light 37.

As illustrated in FIGS. 12(a) and 12(b), reflective layer 61 of reflection control element 60 in this embodiment has a periodic structure comprised of an alternate lamination of homogeneously aligned liquid crystal layers and layers made of polymerized mesomorphism monomer. This structure is formed by sandwiching a mixture of liquid crystal and mesomorphism monomer between transparent electrodes 30 each having transparent electrode 31, homogeneously aligning the mixture, and interferentially exposing the mixture to a laser. More specifically, as two laser beams are directed into reflective layer 61 from both surfaces thereof for interference, a liquid crystal rich layer is formed in a portion irradiated with a laser of lower intensity, while a mesomorphism monomer rich layer, polymerized with mesomorphism monomer, is formed in a portion irradiated with a laser of higher intensity. These layers are periodically formed at periodic intervals 39. In this way, it is possible to Bragg reflect a particular wavelength in accordance with periodic interval 39. This results in emission of polarized light 38 which is Bragg reflected by reflective layer 61.

Here, liquid crystal having positive dielectric anisotropy is employed for the aforementioned liquid crystal. As illustrated in FIG. 12(a), since the liquid crystal has the same refractive index as that of the polymerized mesomorphism monomer when no voltage is applied between transparent electrodes 31, the Bragg reflection does not occur, causing the liquid crystal to be in a transparent state.

On the other hand, when a voltage is applied between transparent electrodes 31 to align the liquid crystal in the vertical direction on the surface of the drawing sheet, as illustrated in FIG. 12(b), a difference in refractive index between the liquid crystal and mesomorphism monomer occurs only in the left-to-right direction on the surface of the drawing sheet, but there is no difference in the refractive index between the liquid crystal and mesomorphism monomer in the direction perpendicular to the surface of the drawing sheet. This can result in the formation of a reflective state having incident polarization dependence, where incident light Bragg reflects in the left-to-right direction on the surface of the drawing sheet, but does not Bragg reflect in the direction perpendicular to the surface of the drawing sheet.

In this embodiment, reflective layer 61 is disposed such that the liquid crystal is aligned in a direction perpendicular to the surface of the drawing sheet. In this way, external light which passes through polarizing plate 10b in FIG. 10 can be Bragg reflected by applying a voltage to reflective layer 61, and can be utilized in the reflective display mode.

To extend a Bragg reflection wavelength band, layers of different periodic intervals may be mixed within the reflective layer.

Figure 13:
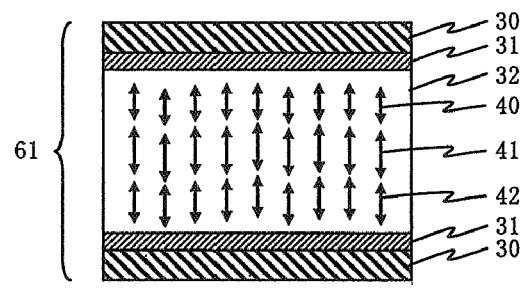
FIG. 13 is a diagram illustrating an exemplary structure of a reflective layer shown in FIGS. 10 and 11, which includes a mixture of layers with different periodic intervals.

Referring to FIG. 13, an exemplary reflective layer is illustrated, where blue periodic interval 40 which is a periodic interval in which blue light is Bragg reflected, green periodic interval 41 which is a periodic interval in which green light is Bragg reflected, and red periodic interval 42 which is a periodic interval in which red light is Bragg reflected are mixed within reflective layer 61 shown in FIGS. 10 and 11.

As illustrated in FIG. 13, layers of different periodic intervals may be mixed within the reflective layer. Alternatively, reflective layers which Bragg reflect light at wavelengths in a red, a green and a blue range, respectively, may be laminated in a manner same as the first embodiment. Further alternatively, layers of different Bragg reflection wavelengths may be disposed side by side. In this way, it is possible to accomplish display operations the same as those in the first embodiment of the present invention.

However, in the reflective display mode, reflective layer 61 of reflection control element 60 must be kept in a reflective state with a voltage applied thereto, whereas in the combined reflective/transmissive display mode and transmissive display mode, reflective layer 61 of reflection control element 60 must be kept in the transmissive state without applying voltage thereto.

The operations and effects in this embodiment except for the foregoing are the same as those in the first embodiment.

Third Embodiment

Figure 14:
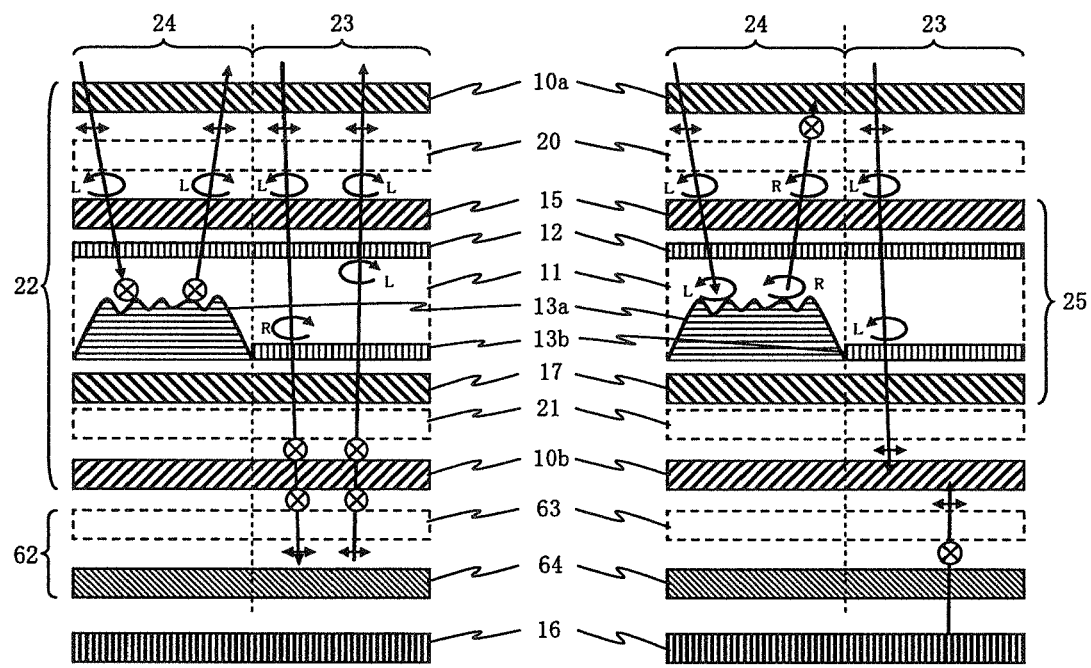
FIG. 14 is a diagram illustrating the configuration of a liquid crystal display element and display operations thereof in a reflective display mode according to a third embodiment of the present invention.
Figure 15:
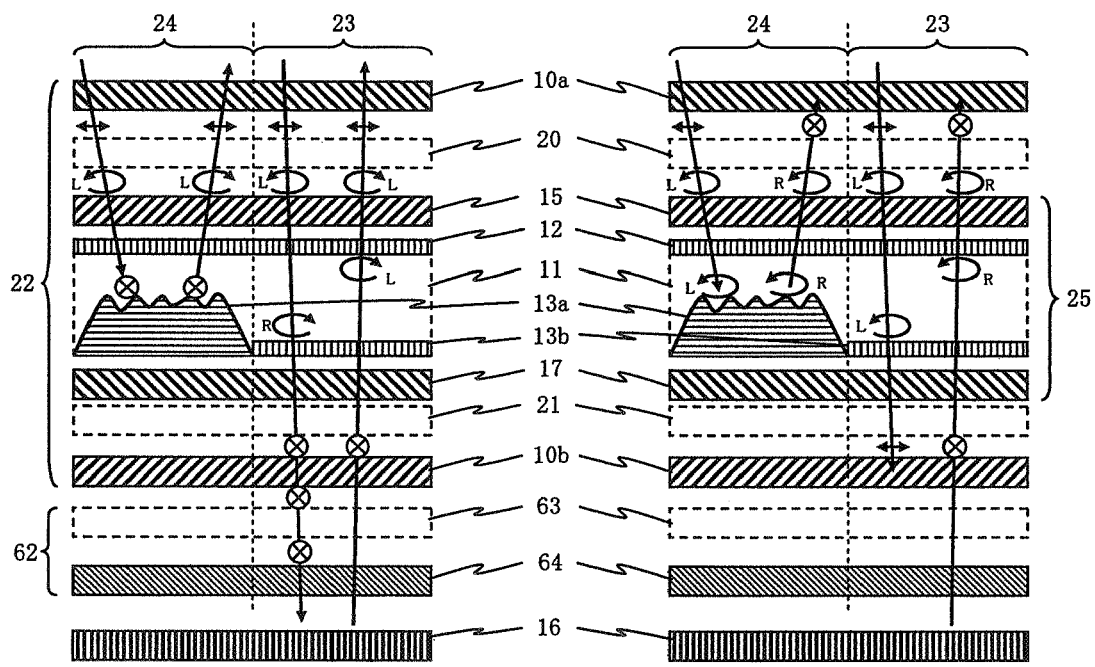
FIG. 15 is a diagram illustrating the configuration of the liquid crystal element and display operations thereof in a combined reflective/transmissive display mode and a transmissive display mode according to the third embodiment of the present invention.

A third embodiment differs from the first and second embodiments in that the third embodiment employs reflection control element 62 which comprises a laminate of phase control layer 63 capable of controlling the phase with a voltage applied thereto, and reflective layer 64 for reflecting certain linearly polarized light and transmitting linearly polarized light orthogonal thereto, as illustrated in FIGS. 14 and 15.

The configuration in this embodiment except for the foregoing is the same as that in the first and second embodiments.

Figure 16:
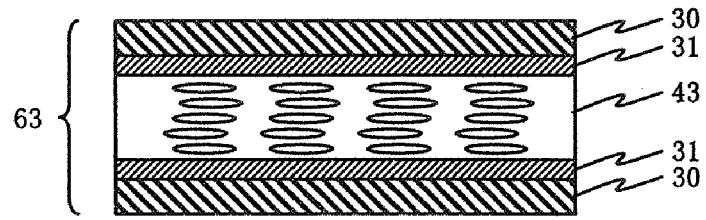
FIG. 16 is a diagram illustrating an exemplary structure of a phase control layer shown in FIGS. 14 and 15.

Referring to FIG. 16, phase control layer 63 shown in FIGS. 14 and 15 is illustrated, where phase control layer 63 comprises transparent substrate 30, transparent electrode 31, and liquid crystal layer 43. As illustrated in FIG. 16, phase control layer 63 comprises homogeneously aligned liquid crystal layer 43 sandwiched between transparent substrates 31 each formed with transparent electrode 30. Retardation (birefringence phase difference) is set in liquid crystal layer 43 such that it functions as a one-half wavelength plate when no voltage is applied thereto. In this embodiment, phase control layer 63 is optically disposed to convert linearly polarized light in a direction perpendicular to the surface of the drawing sheet, which has passed through polarizing plate 10b of liquid crystal display layer 22, into linearly polarized light in the left-to-right direction on the surface of the drawing sheet.

Further, a plurality of phase control layers 63 may be laminated to function as a wider one-half wavelength plate.

A wire grid type reflection polarizing plate corresponding to visible light is employed for reflective layer 64 in this embodiment. With the use of this polarizing plate, reflective layer 64 has a function of transmitting linearly polarized light parallel with line and space comprised of aluminum thin lines equal to or less than visible light and a function of reflecting linearly polarized light orthogonal to the line and space. Then, in this embodiment, reflective layer 64 is disposed to reflect linearly polarized light in the left-to-right direction on the surface of the drawing sheet, as illustrated in FIG. 14.

Here, a semi-transmissive reflective polarizing plate manufactured by Sumitomo 3M under the product name D-BEF may be employed for reflective layer 64.

In this embodiment, linearly polarized light of external light which has passed through polarizing plate 10b, shown in FIG. 14, is converted into linearly polarized light in the left-to-right direction on the surface of the drawing sheet by phase control layer 63 of reflection control element 62. Then, the linearly polarized light can be reflected by reflective layer 64 without changing its polarization state, and can be used in the reflective display mode. On the other hand, in the combined reflective/transmissive display mode and transmissive display mode, a voltage is applied to phase control layer 63, shown in FIG. 15, to eliminate the phase difference. In this way, light from back light source 19 shown in FIG. 15 is transmitted through reflective layer 64 and converted thereby into linearly polarized light in the direction perpendicular to the surface of the drawing sheet, which passes through phase control layer 63 without changing its polarization state. Thus, the light passes through polarizing plate 10b of liquid crystal display layer 22. As a result, the third embodiment can accomplish display operations the same as those in the first and second embodiments of the present invention.

The operations and effects in this embodiment except for the foregoing are the same as those in the first and second embodiments.

Fourth Embodiment

Figure 17:
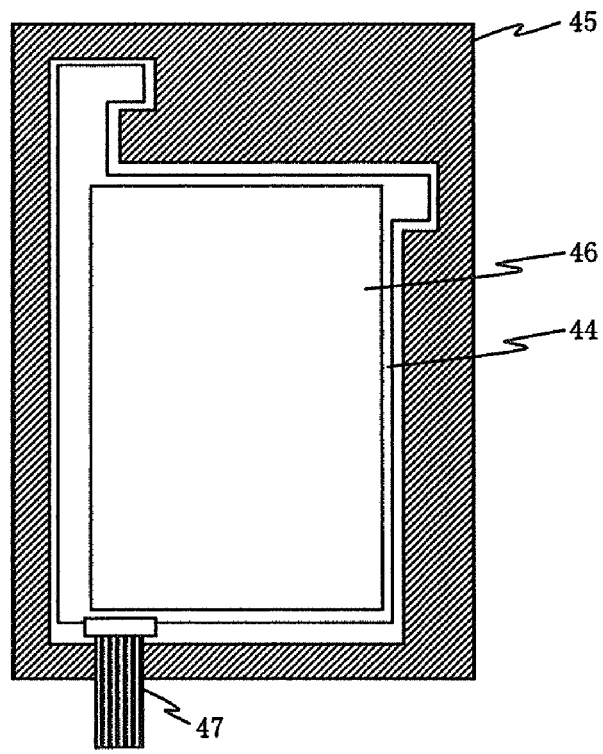
FIG. 17 is a plan view of a reflection control element for a liquid crystal display element according to a fourth embodiment of the present invention.

A fourth embodiment differs from the first to third embodiments in that reflection control element 44 is partially formed with a protrusion and/or a recess, and terminal 47 extends from one side of reflection control element 44 to supply an applied voltage to reflection control element 44, as illustrated in FIG. 17. In addition, liquid crystal display area 46 is provided for displaying a screen.

However, for facilitating the understanding of this embodiment, the protrusion and/or recess of reflection control element 44 are not drawn in scale but are emphasized in FIG. 17.

The configuration in this embodiment except for the foregoing is the same as those in the first to third embodiments.

As illustrated in FIG. 17, reflection control element 44 is formed with a recess/salient portion comprised of a protrusion and/or a recess, and back light source 45 is formed with a recess/salient portion that conforms to the recess/salient portion of reflection control element 44. Further, terminal 47 is formed, extending from one side of reflection control element 44. In this way, when reflection control element 44 is mounted to back light source 45, reflection control element 44 is readily positioned in place with the aid of the presence of the corresponding recess/salient portion. Further, since terminal 47 extends only from one side, reflection control element 44 can be accommodated in a saved space. In addition, reflection control element 44 can be prevented from experiencing problems, e.g., shifting from back light source 45 due to vibrations, impact or the like.

Specifically, reflection control element 44 can be formed with a protrusion by a laser cutter, stamping or the like.

The protrusion and/or recess portion is not limited to the structure illustrated in FIG. 17, but any structure can be employed as long as it facilitates the positioning of back light source 45 in place and prevents problems such as shifting due to vibrations, impact or the like.

The operations and effects in this embodiment except for the foregoing are the same as those in the first to third embodiments.

Fifth Embodiment

Figure 18:
FIG. 18 is a cross-sectional view of a liquid crystal display element according to a fifth embodiment of the present invention.

A fifth embodiment differs from the first to fourth embodiments in that in the fifth embodiment, reflection control element 26 and liquid crystal display layer 22 are optically adhered with transparent adhesive layer 48, as illustrated in FIG. 18.

The configuration in this embodiment except for the foregoing is the same as those in the first to fourth embodiments.

As illustrated in FIG. 18, a liquid crystal display element in this embodiment comprises transparent adhesive layer 48, formed on reflection control element 26, which is adhered to overall liquid crystal display layer 22 for optical adhesion thereto. In this way, it is possible to reduce a loss due to surface reflection which would otherwise occur on the interface between liquid crystal display layer 22 and reflection control element 26. Consequently, the liquid crystal display element can improve the use efficiency of external light and back light.

Adhesive layer 48 used herein can be a UV curable or a thermo-setting transparent adhesive applied and cured on reflection control element 26 or liquid crystal display layer 22, in addition to an adhesive tape having adhesive layers formed on both surfaces of a film base, and a base-less adhesive tape.

When birefringence is caused by a film base or the like, reflection control element 26 is optically designed preferably in consideration of the amount of birefringence by matching the optical axis with the transmission axis or absorption axis of the polarizing plate in liquid crystal display layer 22.

The operations and effects in this embodiment except for the foregoing are the same as those in the first to fourth embodiments.

Sixth Embodiment

Figure 19:
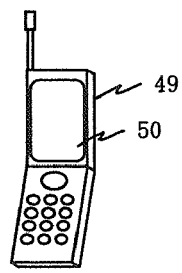
FIG. 19 is a diagram schematically illustrating a sixth embodiment of the present invention.

In a sixth embodiment, liquid crystal display element 50 is contained in portable telephone 49, as illustrated in FIG. 19. Liquid crystal display element 50 contained in portable telephone 49 comprises a sensor capable of sensing the amount of external light. Thus, liquid crystal display element 50 can be automatically switched to either a reflective display mode or combined reflective/transmissive display mode or a transmissive display mode in accordance with the amount of external light sensed by the sensor. This permits the user to comfortably use portable telephone 49 in whatever environment it is used with any level of illumination. In particular, in the reflective display mode, degraded visibility due to parallax (double image) can be prevented in portable telephone 49 and reflectivity can be improved.

Additionally, the user can manually select a preferred display mode by turning off the sensor mounted in liquid crystal display element 50.

Here, while portable telephone 49 exemplifies an electronic device for purposes of description in this embodiment, the electronic device is not so limited, but may be a personal information terminal, a game machine, a digital camera, a video camera, a video player, a notebook type personal computer, a cash dispenser, an automatic vendor or the like as long as they contain liquid crystal display element 50. Also, herein, liquid crystal display element 50 contained in portable telephone 49 is one of the liquid crystal display elements of the present invention previously described in the other embodiments.

Seventh Embodiment

A seventh embodiment differs from the sixth embodiment in that a sensor is mounted in a portable telephone for sensing the amount of external light irradiated to a liquid crystal display element.

The configuration in this embodiment except for the foregoing is the same as that of the sixth embodiment.

Thus, no sensor need be mounted in the liquid crystal display element, advantageously resulting in an increased degree of freedom for designing the liquid crystal display element.

While the portable telephone exemplifies an electronic device for purposes of description in this embodiment, the electronic device is not so limited, but may be a personal information terminal, a game machine, a digital camera, a video camera, a video player, a notebook type personal computer, a cash dispenser, an automatic vendor or the like as long as they contain the liquid crystal display element.

The operations and effects in this embodiment except for the foregoing are the same as those of the sixth embodiment.

Eighth Embodiment

In the foregoing description, liquid crystal display layer 22 in the first to third embodiment comprises polarizing plate 10b, phase compensation layer 21, liquid crystal layer 25, phase compensation layer 20, and polarizing plate 10a which are laminated in this order from back light source 16. However, the laminating order is not so limited.

Figure 20:
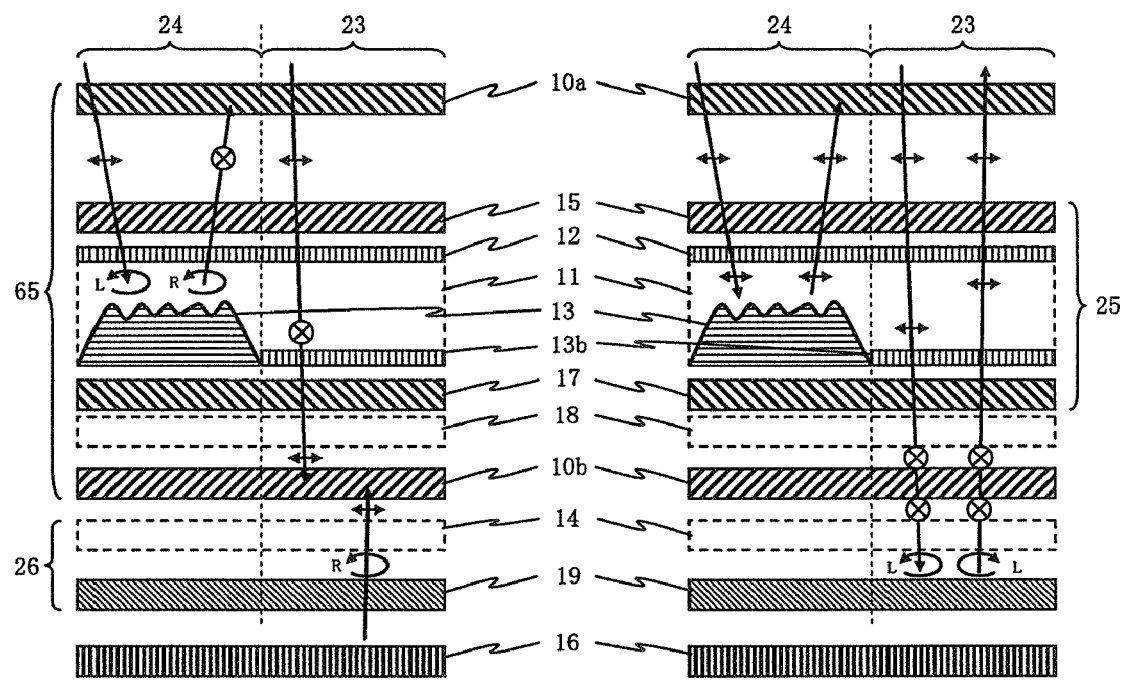
FIG. 20 is a diagram illustrating the configuration of a liquid crystal display element and display operations thereof in a reflective display mode according to an eighth embodiment of the present invention.
Figure 21:
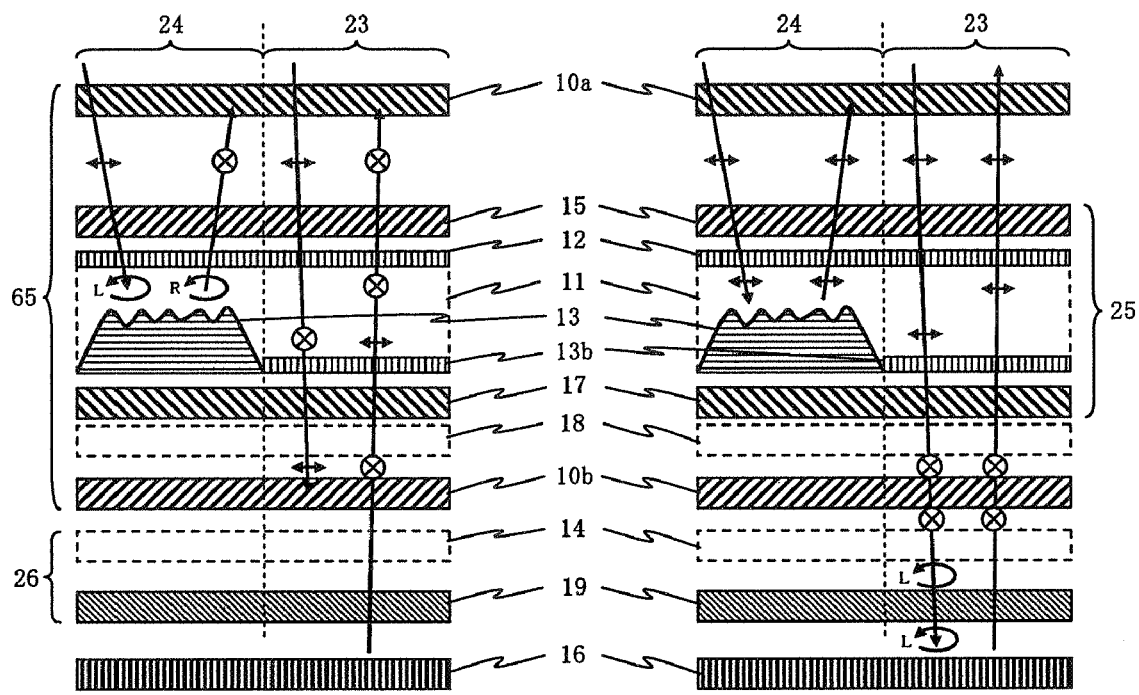
FIG. 21 is a diagram illustrating the configuration of the liquid crystal display element and display operations thereof in a combined reflective/transmissive display mode and a transmissive display mode according to the eighth embodiment of the present invention.

Referring to FIGS. 20 and 21, liquid crystal display layer 65 is illustrated in a structure which comprises polarizing plate 10b, one-half wavelength plate 18, liquid crystal layer 25, and polarizing plate 10a, laminated in this order from back light source 16. Even this structure produces same effects as well.

In regard to display operations in the liquid crystal display element in the reflective display mode illustrated in FIG. 20, non-polarized external light incident on polarizing plate 10a from the top side of the drawing sheet is transmitted through polarizing plate 10a and thereby converted into linearly polarized light in the left-to-right direction on the surface of the drawing sheet in reflective display unit 24, as illustrated in the left-hand cross-sectional view of FIG. 20. This linearly polarized light is converted into generally left-hand circularly polarized light with its phase being rotated by a phase difference (one quarter wavelength) of liquid crystal 11 when no voltage is applied thereto. Then, as the generally left-hand circularly polarized light is reflected by reflecting plate 13a including an electrode, the generally left-hand circularly polarized light is converted into generally right-hand circularly polarized light. This generally right-hand circularly polarized light is further converted into linearly polarized light in a direction perpendicular to the surface of the drawing sheet with its phase rotated by one quarter wavelength due the phase difference of liquid crystal 11. Since this linearly polarized light is orthogonal to the transmission axis of polarizing plate 10a, the linearly polarized light is absorbed. Accordingly, a resulting image is displayed in a dark state.

On the other hand, when a voltage is applied to liquid crystal 11 to substantially eliminate the phase difference of liquid crystal 11, as illustrated in the right-hand cross-sectional view of FIG. 20, linearly polarized light in the left-to-right direction on the surface of the drawing sheet, incident on liquid crystal 11, impinges on reflecting plate 13a including an electrode without changing the polarization state. The linearly polarized light incident on reflecting plate 13a is reflected by the same without changing the polarization state. Subsequently, the linearly polarized light passes through liquid crystal 11 as it is. Then, since the linearly polarized light in the left-to-right direction on the surface of the drawing sheet matches with the transmission axis of polarizing plate 10a, the linearly polarized light passes through polarizing plate 10a without being absorbed thereby. Accordingly, a resulting image is displayed in a bright state. In addition, a half-tone image can be displayed by varying the voltage applied to liquid crystal 11.

In transmissive display unit 23, on the other hand, incident linearly polarized light in the left-to-right direction on the surface of the drawing sheet is converted into linearly polarized light in the direction perpendicular to the surface of the drawing sheet with its phase being rotated by a phase difference (one half wavelength) of liquid crystal 11 when no voltage is applied thereto. Subsequently, the linearly polarized light is converted into linear polarized light in the left-to-right direction on the surface of the drawing sheet by one-half wavelength plate 18 with its phase being rotated by one half wavelength. Since this linearly polarized light is orthogonal to the transmission axis of polarizing plate 10b, the linearly polarized light is absorbed thereby. Accordingly, the resulting image is displayed in a dark state, as is the case with reflective display unit 24.

As illustrated in the right-hand cross-sectional view of FIG. 20, when a voltage is applied to liquid crystal 11, the phase difference is substantially eliminated from liquid crystal 11. For this reason, linearly polarized light in the left-to-right direction on the surface of the drawing sheet, incident on liquid crystal 11, impinges on one-half wavelength plate 18 without changing its polarization state. The incident linearly polarized light in the left-to-right direction on the surface of the drawing sheet is converted into linearly polarized light in the direction perpendicular to the surface of the drawing sheet with its phase being rotated by one half wavelength. The resulting linearly polarized light passes through polarizing plate 10b. The linearly polarized light, which has passed through polarizing plate 10b, is converted into left-hand circularly polarized light due to a phase difference of phase control layer 14. Then, since left-handed spiral cholesteric liquid crystal in reflective layer 19 is in a reflective state, the left-hand circularly polarized light is reflected by reflective layer 19 without changing its polarization state. As the left-hand circularly polarized light again impinges on phase control layer 14, the left-hand circularly polarized light is converted into linearly polarized light in the direction perpendicular to the surface of the drawing sheet by phase control layer 14. Since this linearly polarized light matches the transmission axis of polarizing plate 10b, the linearly polarized light passes through polarizing plate 10b without being absorbed thereby. The linearly polarized light, which has passed through polarizing plate 10b, is converted into linearly polarized light in the left-to-right direction on the surface of the drawing sheet by one-half wavelength plate 18, and the resulting linearly polarized light passes through liquid crystal 11 without changing the polarization state. Since this linearly polarized light matches the transmission axis of polarizing plate 10a, the linearly polarized light passes through polarizing plate 10a without being absorbed thereby. Accordingly, the resulting image is displayed in a bright state.

Here, in the reflective display mode, reflection control element 26 is kept in a reflective state, and the same voltage is applied to reflective display unit 24 and transmissive display unit 23 in synchronization.

Next, display operations in the combined transmission/reflective display mode and transmissive display mode will be described in detail in the liquid crystal display element illustrated in FIG. 21.

In these display modes, reflection control element 26 is utilized in a transmissive state. Also, in the combined reflective/transmissive display mode, the same voltage is applied to reflective display unit 24 and transmissive display unit 23 in synchronization. Further, in the transmissive display mode, reflective display unit 24 is kept in a dark state at all times such that it is not utilized for displaying an image. Furthermore, back light source 16 is driven to irradiate light.

In the combined reflective/transmissive display mode, display operations in reflective display unit 24 are the same as the reflective display operations described in connection with FIG. 20, as illustrated in the left-hand and right-hand cross-sectional views of FIG. 21.

Display operations in transmissive display unit 23 will be described below.

In transmissive display unit 23 shown in the left-hand cross-sectional view of FIG. 21, external light incident thereon from the top side of the drawing sheet is absorbed by polarizing plate 10b. Therefore, the external light cannot be utilized for displaying an image.

Light irradiated from back light source 16, on the other hand, is transmitted through reflection control element 26 without polarization, impinges on polarizing plate 10b, and is converted into linearly polarized light in the direction perpendicular to the surface of the drawing sheet by polarizing plate 10b, and is transmitted through polarizing plate 10b. The transmitted linearly polarized light is converted into linearly polarized light in the left-to-right direction on the surface of the drawing sheet by one-half wavelength plate 18, and is again converted into linearly polarized light in the direction perpendicular to the surface of the drawing sheet by liquid crystal 11, applied with no voltage, with its phase being rotated by one half wavelength. Since this linearly polarized light is orthogonal to the transmission axis of polarizing plate 10a, the linearly polarized light is absorbed thereby. Accordingly, the resulting image is displayed in a dark state.

On the other hand, as a voltage is applied to liquid crystal 11, light irradiated from back light source 16 is transmitted through polarizing plate 10b and converted into linearly polarized light in the direction perpendicular to the surface of the drawing sheet. Then, the linearly polarized light is converted into linearly polarized light in the left-to-right direction on the surface of the drawing sheet by one-half wavelength plate 18, and impinges on liquid crystal 11. Since liquid crystal 11 is free from a phase difference, the linearly polarized light passes through liquid crystal layer 25 without changing its polarization state. Since this linearly polarized light matches with the transmission axis of polarizing plate 10a, the linearly polarized light passes through polarizing plate 10a as it is. Accordingly, the resulting image is displayed in a bright state.

As described above, even when liquid crystal layer 22 is modified, the resulting liquid crystal display element produces same effects to those of the first to third embodiments.

Liquid crystal display layer 22 is not limited to the foregoing structure, but any structure may be employed as long as the structure causes reflection control element 26 to reflect external light which has exited polarizing plate 10b, and performs the same display operations as reflective display unit 24 in the pixel.

The reflection control element may have a reflective layer for Bragg reflecting light having a particular wavelength band, and control the reflectivity of the reflective layer with a voltage applied thereto.

Alternatively, the reflection control element may comprise a reflective layer for Bragg reflecting light having a particular wavelength band, and a phase control layer for controlling the phase of the reflective layer, and to control the reflectivity of the reflective layer with a voltage applied thereto, where the reflective layer and phase control layer may be laminated in this order on a light source.

The light source may reduce the amount of light irradiated therefrom in association with an increase in the reflectivity of the reflective layer.

Further alternatively, the reflection control element may comprise a reflective layer for reflecting at least one type of polarized light and for transmitting different polarized light, and a phase control layer for controlling the phase of the reflective layer with a voltage applied thereto, where the reflective layer and phase control layer may be laminated in this order on the light source.

Also, the reflection control element may comprise a plurality of reflective layers laminated in a direction in which the liquid crystal display layer and light source are laminated.

Alternatively, the reflection control element may comprise a plurality of reflective layers which are laminated in a direction orthogonal to the direction in which the liquid crystal display layer and light source are laminated.

Also, the reflection control element may comprise a layer which includes liquid crystal.

The reflective layer, whose reflectivity is controlled with an applied voltage, may include cholesteric liquid crystal.

Alternatively, the reflective layer, whose reflectivity is controlled with an applied voltage, may comprise alternate lamination of liquid crystal droplet layers including liquid crystal droplets and at least one polymer layer.

Further alternatively, the reflective layer, whose reflectivity is controlled with an applied voltage, may comprise a polymer layer including cholesteric liquid crystal droplets.

The reflection control element may be partially formed with a protrusion and/or a recess.

The reflection control element may be optically adhered to the liquid crystal display layer.

Also, a terminal for supplying an applied voltage may extend from one side of the reflection control element.

A sensor may also be provided for sensing the amount of external light irradiated to the liquid crystal display element, such that the reflective display unit and transmissive display unit of the liquid crystal display layer are respectively utilized for displaying an image in accordance with the amount of external light sensed by the sensor, where a display mode may be switched in accordance with the reflectivity of the reflection control element based on the amount of irradiated light from the light source.

Also, an electronic device equipped with a liquid crystal display element may comprise a sensor for sensing the amount of external light irradiated to the liquid crystal display element, utilize the reflective display unit and transmissive display unit of the liquid crystal display layer for displaying an image in accordance with the amount of external light sensed by the sensor, and may switch to a display mode in accordance with the reflectivity of the reflection control element based on the amount of irradiated light from the light source.

While a preferred embodiment of the present invention has been described in specific terms, such description is for illustrative purpose only, and it is to be understood that changes and variations may be made without departing from the spirit or scope of the following claims.

What is claimed is:

1. A liquid crystal display element comprising:
   a liquid crystal display layer including an internal reflecting plate, a transmissive display unit, and a reflective display unit, wherein at least the transmissive display unit and the reflective display unit are formed in one pixel and said transmissive display unit and said reflective display unit are applied with voltages independently of each other;
   a light source for irradiating said liquid crystal display layer with light from a back; and
   a reflection control element disposed between said liquid crystal display layer and said light source for switching between a reflective state and a transmissive state in accordance with a voltage applied thereto,
   wherein said liquid crystal display element is switched to either:
   a transmissive display mode which involves setting said reflection control element into a transmissive state, setting the reflective display unit of said liquid crystal display layer into a dark state, and displaying an image in said transmissive display unit; or
   a combined reflective/transmissive display mode which involves setting said reflection control element into a transmissive state, and displaying an image in the reflective display unit and transmissive display unit of said liquid crystal display layer; or
   a reflective display mode which involves setting said reflection control element into a reflective state, and displaying an image in the reflective display unit and transmissive display unit of said liquid crystal display layer.

2. The liquid crystal display element according to claim 1, wherein said reflection control element comprises a reflective layer for Bragg reflecting light having a particular wavelength band, and controls the reflectivity of said reflective layer with a voltage applied thereto.

3. The liquid crystal display element according to claim 1, wherein:
   said reflection control element comprises:
   a reflective layer for Bragg reflecting light having a particular wavelength band, the reflective layer disposed on the light source; and
   a phase control layer for controlling a phase of said reflective layer, the phase control layer disposed on the reflective layer,
   wherein said reflection control element controls the reflectivity of said reflective layer with the voltage applied thereto.

4. The liquid crystal display element according to claim 2, wherein said light source reduces the amount of light irradiated therefrom in association with an increase in the reflectivity of said reflective layer.

5. The liquid crystal display element according to claim 1, wherein:
   said reflection control element comprises:
   a reflective layer for reflecting at least one type of polarized light, and for transmitting polarized light different from the polarized light, the reflective layer disposed on the light source; and
   a phase control layer for controlling a phase of said reflective layer with the applied voltage, the phase control layer disposed on the reflective layer.

6. The liquid crystal display element according to claim 2, wherein said reflective control element comprises a plurality of said reflective layers disposed in a direction in which said liquid crystal display layer and said light source oppose each other.

7. The liquid crystal display element according to claim 2, wherein said reflection control element comprises a plurality of said reflective layers disposed in parallel in a direction orthogonal to a direction in which said liquid crystal display layer and said light source oppose each other.

8. The liquid crystal display element according to claim 1, wherein said reflection control element comprises a layer including liquid crystal.

9. The liquid crystal display element according to claim 2, wherein said reflective layer, whose reflectivity is controlled with the applied voltage includes cholesteric liquid crystal.

10. The liquid crystal display element according to claim 2, wherein said reflective layer, whose reflectivity is controlled with the applied voltage, comprises alternate lamination of liquid crystal droplet layers each including liquid crystal droplets, and at least one polymer layer.

11. The liquid crystal display element according to claim 2, wherein said reflective layer, whose reflectivity is controlled with the applied voltage, comprises a polymer layer including cholesteric liquid crystal droplets.

12. The liquid crystal display element according to claim 1, wherein said reflection control element is partially formed with a protrusion and/or a recess.

13. The liquid crystal display element according to claim 1, wherein said reflection control element is optically adhered to said liquid crystal display layer.

14. The liquid crystal display element according to claim 1, further comprising a terminal extending from one side of said reflection control element to supply the applied voltage.

15. The liquid crystal display element according to claim 1, further comprising a sensor for sensing the amount of external light irradiated to said liquid crystal display element,
wherein said liquid crystal display element utilizes the reflective display unit and transmissive display unit of said liquid crystal display layer respectively for displaying an image in accordance with the amount of external light sensed by said sensor, and switches to a display mode in accordance with the reflectivity of said reflection control element and which is based upon the amount of irradiated light from said light source.

16. An electronic device comprising the liquid crystal display element according to claim 1, and a sensor for sensing the amount of external light irradiated to said liquid crystal display element, wherein said electronic device utilizes the reflective display unit and transmissive display unit of said liquid crystal display layer respectively for displaying an image in accordance with the amount of external light sensed by said sensor, and switches to a display mode in accordance with the reflectivity of said reflection control element and which is based upon the amount of irradiated light from said light source.

17. An electronic device comprising the liquid crystal display element according to claim 15.

* * * * *